(12) United States Patent
Nakane

(10) Patent No.: US 7,916,005 B2
(45) Date of Patent: Mar. 29, 2011

(54) ANTI-THEFT DEVICE FOR VEHICLE

(75) Inventor: Yoshihide Nakane, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 976 days.

(21) Appl. No.: 10/574,010

(22) PCT Filed: Apr. 22, 2005

(86) PCT No.: PCT/JP2005/008275
§ 371 (c)(1),
(2), (4) Date: Mar. 29, 2006

(87) PCT Pub. No.: WO2006/003752
PCT Pub. Date: Jan. 12, 2006

(65) Prior Publication Data
US 2007/0024419 A1 Feb. 1, 2007

(30) Foreign Application Priority Data

Jun. 30, 2004 (JP) ................................ 2004-193803

(51) Int. Cl.
*B60R 25/10* (2006.01)
(52) U.S. Cl. ................. 340/426.36; 340/5.72; 340/5.82; 307/10.2; 307/10.5
(58) Field of Classification Search .................. 340/5.72, 340/5.65, 5.52, 5.42
See application file for complete search history.

(56) References Cited

U.S. PATENT DOCUMENTS

| | | | | |
|---|---|---|---|---|
| 5,229,648 A | * | 7/1993 | Sues et al. .................... | 307/10.2 |
| 5,760,701 A | * | 6/1998 | Mitsumoto ................... | 340/5.72 |
| 5,790,043 A | * | 8/1998 | Hettich et al. ............... | 340/5.62 |
| 5,861,816 A | * | 1/1999 | Funakoshi et al. ........... | 340/5.31 |
| 6,075,454 A | * | 6/2000 | Yamasaki .................... | 340/5.61 |
| 6,744,349 B1 | * | 6/2004 | Asakura et al. .............. | 340/5.62 |
| 6,873,840 B1 | * | 3/2005 | von Alten .................... | 455/410 |
| 6,891,467 B2 | * | 5/2005 | Perttunen et al. ........ | 340/426.17 |
| 2001/0026213 A1 | * | 10/2001 | Onuma et al. ............... | 340/5.65 |
| 2002/0043566 A1 | * | 4/2002 | Goodman et al. ............ | 235/492 |
| 2002/0097141 A1 | * | 7/2002 | Denison et al. .............. | 340/5.51 |
| 2002/0097145 A1 | * | 7/2002 | Tumey et al. ................. | 340/426 |
| 2003/0046540 A1 | | 3/2003 | Nakamura et al. | |
| 2004/0085189 A1 | * | 5/2004 | Nagai et al. .................. | 340/5.72 |

FOREIGN PATENT DOCUMENTS

| | | |
|---|---|---|
| EP | 1 286 297 A | 2/2003 |
| EP | 1286297 A1 * | 2/2003 |
| JP | A 2000-311220 | 11/2000 |
| JP | A 2000-352245 | 12/2000 |
| JP | A 2003-311220 | 11/2003 |

* cited by examiner

*Primary Examiner* — Benjamin C Lee
*Assistant Examiner* — Curtis J King
(74) *Attorney, Agent, or Firm* — Oliff & Berridge, PLC

(57) ABSTRACT

An anti-theft system for a vehicle, includes certifying means of an electronic key for getting in the vehicle, human body certification information certifying means, door lock control means for unlocking a vehicle door in a case where the electronic key is certified by the certifying means of the electronic key for getting in the vehicle and the human body certification information of the person is confirmed by the human body certification information certifying means in a state where the door is unlocked; memory means for memorizing ID information of the electronic key; certifying means of an electronic key for starting an engine; and engine starting control means for starting the engine of the vehicle in a case where the electronic key is certified by the certifying means of the electronic key for starting the engine and the electronic key is an electronic key whose ID information is memorized in the memory means, after the vehicle door is unlocked by the door lock control means.

12 Claims, 6 Drawing Sheets

FIG.3

INITIAL STATE

| ELECTRONIC KEY ID | PERMISSION NUMBER |
|---|---|
| 001 | 0 |
| 002 | 0 |
| 003 | 0 |
| ⋮ | ⋮ |
| 00× | 0 |

30

AT THE TIME OF GETTIN IN VEHICLE
- E.KEY CERTIFIED
- HUMAN BODY INFO. CERTIFIED ] OK

AFTER ELECTRONIC KEY "002" IS CERTIFIED

| ELECTRONIC KEY ID | PERMISSION NUMBER |
|---|---|
| 001 | 0 |
| 002 | 1 |
| 003 | 0 |
| ⋮ | ⋮ |
| 00× | 0 |

| ELECTRONIC KEY ID | MAXIMUM PERMISSION NUMBER |
|---|---|
| 001 | 100 |
| 002 | 10 |
| 003 | 0 |
| . | . |
| . | . |
| . | . |
| 00× | 1 |

FIG.7

| HUMAN BODY | MAXIMUM PERMISSION NUMBER |
|---|---|
| MR. A | 2 |
| MR. A's WIFE | 2 |
| CHILD (18 YEARS AND OVER) | 1 |
| CHILD (UNDER 18) | 0 | ized in the memory means by the electronic key which is

ANTI-THEFT DEVICE FOR VEHICLE

TECHNICAL FIELD

The present invention generally relates to anti-theft devices for vehicles, and more particularly, to an anti-theft device for a vehicle whereby a locked vehicle door is unlocked or a stopped vehicle engine is started in a case where human body certification information of a human is confirmed or an electronic key held by the human is confirmed.

BACKGROUND ART

An anti-theft device, whereby human body certification information such as a fingerprint or an iris/retina of a driver seated on a driving seat is read and a vehicle can be driven in a case where the human body-certification information is confirmed, is known. See Japan Laid-Open Patent Publication No. 2000-311220. According to the above-mentioned device, since the driving of the vehicle can be permitted for only a person being permitted to drive the vehicle in advance, it is possible to achieve a higher security level regarding driving of the vehicle and effectively prevent vehicle theft.

However, in a case where plural device provided in the vehicle are operated, it is necessary to read and confirm the human body certification information of the user for operating each machine such as unlocking the vehicle door or starting the vehicle engine. Hence, while a high security is achieved, it is necessary to provide a device for confirming the human body certification information for each machine and therefore the size of the entirety of devices installed in the vehicle is large.

DISCLOSURE OF THE INVENTION

Accordingly, it is a general object of the present invention to provide a novel and useful anti-theft device for a vehicle.

Another and more specific object of the present invention is to provide an anti-theft device for a vehicle whereby unlocking a vehicle door and starting a vehicle engine can be realized with a simple structure and without loosing security.

The above object of the present invention is achieved by commonly confirming human body certification information in the anti-theft vehicle device.

More specifically, the above object of the present invention is achieved by an anti-theft system for a vehicle, including:

certifying means of an electronic key for getting in the vehicle, the means being for certifying the electronic key held by a person who intends to get in the vehicle;

human body certification information certifying means, the means being for confirming human body certification information of the person;

door lock control means for unlocking a vehicle door in a case where the electronic key is certified by the certifying means of the electronic key for getting in the vehicle and the human body certification information of the person is confirmed by the human body certification information certifying means in a state where the door is unlocked;

memory means for memorizing ID information of the electronic key when the vehicle door is unlocked by the door lock control means based on the electronic key being certified by the certifying means of the electronic key for getting in the vehicle and the human body certification information of the person is confirmed by the human body certification information certifying means;

certifying means of an electronic key for starting an engine, the means being for certifying the electronic key held by a person who intends to start the engine; and engine starting control means for starting the engine of the vehicle in a case where the electronic key is certified by the certifying means of the electronic key for starting the engine and the electronic key is an electronic key whose ID information is memorized in the memory means, after the vehicle door is unlocked by the door lock control means.

In the above-mentioned invention, the door is unlocked in a case where the electronic key is certified and the human body certification information of the person is confirmed. When the vehicle door is unlocked, the ID information of the electronic key is memorized in the memory means. After that, the engine is started only when the electronic key is certified by the certifying means of the electronic key for starting the engine and the electronic key is an electronic key whose ID information is memorized in the memory means. Under this structure, it is not necessary to confirm the human body certification information of the person getting in the vehicle at the time of starting the engine for the purpose of ensuring security regarding the starting of the engine. Accordingly, it is possible to make the size of the device small without reducing the security and to achieve a low cost. In addition, since the engine is started only when the electronic key is certified by the certifying means of the electronic key for starting the engine and the electronic key is an electronic key whose ID information is memorized in the memory means, it is possible to prevent a decrease in the security when the engine is started.

The memory means may memorize, in advance, a maximum number of times for permitting starting the engine after the door is unlocked by the door lock control means and the engine starting control means may allow starting the engine for the permitted maximum number of times memorized in the memory means by the electronic key which is certified by the certifying means of the electronic key for starting the engine and whose ID information is memorized in the memory means, after the door is unlocked by the door lock control means.

Under this structure, it is possible to permit starting the engine plural times after the door is unlocked and to restart the engine plural times after the failure of the starting of the engine, so that it is possible to improve the convenience to the person getting in the vehicle.

The memory means may memorize, in advance, a maximum number of times for permitting starting the engine after the door is unlocked by the door lock control means, the maximum number being set for every electronic key which is certified and registered, and the engine starting control means may allow starting the engine for the permitted maximum number of times memorized in the memory means by the electronic key which is certified by the certifying means of the electronic key for starting the engine and whose ID information is memorized in the memory means, the maximum number corresponding to the electronic key and being memorized in the memory means, after the door is unlocked by the door locking control means.

Under this structure, it is possible to permit starting the engine plural different times after the door is unlocked and to restart the engine plural different times after the failure of starting the engine for every electronic key, so that it is possible to start the engine in a state of being consistent with each person getting in the vehicle.

The memory means may memorize, in advance, a maximum number of times for permitting starting the engine after the door is unlocked by the door lock control means, the maximum number being set for every person who is certified and registered, and the engine starting control means may allow starting the engine for the permitted maximum number of times memorized in the memory means by the electronic key which is certified by the certifying means of the electronic key for starting the engine and whose ID information is memorized in the memory means, the maximum number corresponding to the person whose human body certification information is confirmed by the human body information certifying means at the time when the door is unlocked by the door locking control means, the maximum number being memorized in the memory means, after the door is unlocked by the door locking control means.

Under this structure, it is possible to permit starting the engine plural different times after the door is unlocked and to restart the engine plural different times after the failure of starting the engine for every person, so that it is possible to start the engine in a state of being consistent with each person getting in the vehicle.

The engine starting control means may include permission number reducing means for reducing the number of times of permission for starting the engine by using the electronic key which is certified by the certifying means of the electronic key for starting the engine and whose ID information is memorized in the memory means, when a designated time during which the engine is continued being run passes.

Under this structure, since the permitted number of times for starting the engine is not decreased as long as the engine does not continued to run, it is possible to make the permission number as small as possible even if the failure of the starting of the engine is considered.

The above-mentioned object of the present invention is achieved by an anti-theft system for a vehicle, including:

certifying means of an electronic key for getting in the vehicle, the means being for certifying the electronic key held by a person who intends to get in the vehicle;

human body certification information certifying means, the means being for confirming human body certification information of the person;

door lock control means for unlocking a vehicle door in a case where the electronic key is certified by the certifying means of the electronic key for getting in the vehicle and the human body certification information of the person is confirmed by the human body certification information certifying means in a state where the door is unlocked;

writing means for writing information that the human body certification information is confirmed in the electronic key as readable or delete-able information, when the vehicle door is unlocked by the door lock control means based on the electronic key being certified by the certifying means of the electronic key for getting in the vehicle and the human body certification information of the person being confirmed by the human body certification information certifying means;

certifying means of an electronic key for starting an engine, the means being for certifying the electronic key held by a person who intends to start the engine; and engine starting control means for starting the engine of the vehicle in a case where the electronic key is certified by the certifying means of the electronic key for starting the engine and the information that the human body certification information is certified is written in the electronic key, after the vehicle door is unlocked by the door control means.

In the above-mentioned invention, the door is unlocked in a case where the electronic key is certified and the human body certification information of the person is confirmed. When the vehicle door is unlocked, the information that the human body certification information is confirmed is written in the electronic key. After that, the engine is started only when the electronic key held by the person who intends to start the engine is certified by the certifying means of the electronic key for starting the engine and the information that the human body certification information is confirmed is written in the electronic key. Under this structure, it is not necessary to confirm the human body certification information of the person getting in the vehicle at the time of starting the engine for the purpose of ensuring security regarding the starting of the engine. Accordingly, it is possible to make the size of the device small without reducing the security and to achieve a low cost. In addition, since the engine is started only when the electronic key held by the person who intends to start the engine is certified by the certifying means of the electronic key for starting the engine and the information that the human body certification information is confirmed is written in the electronic key, it is possible to prevent a decrease in security when the engine is started.

The above-object of the present invention is achieved by an anti-theft system for a vehicle, including:

certifying means of an electronic key for starting a vehicle engine, the means being for certifying the electronic key held by a person who intends to start the vehicle;

human body certification information certifying means, the means being for confirming human body certification information of the person;

engine starting control means for starting the engine in a case where the electronic key is certified by the certifying means of the electronic key for starting the engine and the human body certification information of the person is confirmed by the human body certification information certifying means in a state where the engine is stopped running;

memory means for memorizing ID information of the electronic key when the engine is started by the engine starting control means based on the electronic key being certified by the certifying means of the electronic key for starting the engine and the human body certification information of the person being confirmed by the human body certification information certifying means;

certifying means of an electronic key for getting in the vehicle, the means being for certifying the electronic key held by a person who intends to get in the vehicle; and door locking control means for unlocking the door in a case where the electronic key is certified by the certifying means of the electronic key for getting in the vehicle and the electronic key is an electronic key whose ID information is memorized in the memory means, after the engine is started by the engine starting control means.

In the above-mentioned invention, the engine is started in a case where the electronic key is certified and the human body certification information of the person who intends to start the engine is confirmed. When the engine is started, the ID information of the electronic key is memorized in the memory means. After that, the door is unlocked only when the electronic key is certified by the certifying means of the electronic key for getting in the vehicle and the electronic key is an electronic key whose ID information is memorized in the memory means. Under this structure, it is not necessary to confirm the human body certification information of the person getting in the vehicle at the time of unlocking the door for the purpose of ensuring the security regarding the unlocking of the door. Accordingly, it is possible to make the size of the device small without reducing the security and to achieve a low cost. In addition, since the door is unlocked only when the electronic key is certified by the certifying means of the electronic key for getting in the vehicle and the electronic key is an electronic key used for starting the engine, it is possible to prevent a decrease in security when the engine is started.

The memory means may memorize, in advance, a maximum number of times for permitting unlocking the door after the engine is started by the engine starting control means, and the door locking control means may allow unlocking the door for the permitted maximum number of times memorized in the memory means by the electronic key which is certified by the certifying means of the electronic key for getting in the vehicle and whose ID information is memorized in the memory means, after the engine is started by the engine starting control means.

Under this structure, it is possible to permit unlocking the door plural times after the engine is started and to re-unlock the door plural times after the failure of unlocking the door, so that it is possible to improve the convenience to the person getting in the vehicle.

The memory means may memorize, in advance, a maximum number of times for permitting unlocking the door after the engine is started by the engine starting control means, the maximum number of times being set for every electronic key which is certified and registered, and the door locking control means may allow unlocking the door for the permitted maximum number of times memorized in the memory means by the electronic key which is certified by the certifying means of the electronic key for getting in the vehicle and whose ID information is memorized in the memory means, the maximum number corresponding to the electronic key and being memorized in the memory means, after the vehicle is started by the engine starting control means.

Under this structure, it is possible to permit unlocking the door plural times after the engine is started and to re-unlock the door plural times after the failure of unlocking the door for every electronic key, so that it is possible to start the engine in a state of being consistent with each person getting in the vehicle.

The memory means may memorize, in advance, a maximum number of times for permitting unlocking the door after the engine is started by the engine starting control means, the maximum number being set for every person who is certified and registered, and the door locking control means may allow unlocking the door for the permitted maximum number of times memorized in the memory means by the electronic key which is certified by the certifying means of the electronic key for getting in the vehicle and whose ID information is memorized in the memory means, the maximum number corresponding to the person whose human body certification information is confirmed by the human body information certifying means at the time when the engine is started by the engine starting control means, the maximum number being memorized in the memory means, after the engine is started by the engine starting control means.

Under this structure, it is possible to permit unlocking the door plural times after the engine is started and to re-unlock the door plural times after the failure of unlocking the door for every the person, so that it is possible to start the engine in a state of being consistent with each person getting in the vehicle.

The door locking control means may include permission number reducing means for reducing the number of time of permission for unlocking the door by using the electronic key which is certified by the certifying means of the electronic key for getting in the vehicle and whose ID information is memorized in the memory means, when the vehicle door is unlocked and then opened.

Under this structure, since the permitted number of times for unlocking the door is not decreased as long as the door is not opened after being unlocked, it is possible to make the permission number as small as possible even if the failure of unlocking the door is considered.

The above-mentioned object of the present invention is achieved by an anti-theft system for a vehicle, including:

certifying means of an electronic key for starting a vehicle engine, the means being for certifying the electronic key held by a person who intends to start the vehicle;

human body certification information certifying means, the means being for confirming human body certification information of the person;

engine starting control means for starting the engine in a case where the electronic key is certified by the certifying means of the electronic key for starting the engine and the human body certification information of the person is confirmed by the human body certification information certifying means in a state where the engine is stopped running;

writing means for writing information that the human body certification information is confirmed to the electronic key as readable or delete-able information, when the engines is started by the engine starting control means based on the electronic key being certified by the certifying means of the electronic key for starting the engine and the human body certification information of the person being confirmed by the human body certification information certifying means;

certifying means of an electronic key for getting in the vehicle, the means being for certifying the electronic key held by a person who intends to get in the vehicle; and door locking control means for unlocking the door in a case where the electronic key is certified by the certifying means of the electronic key for getting in the vehicle and information that the human body certification information is confirmed is written in the electronic key, after the engine is started by the engine starting control means.

In the above-mentioned invention, the engine is started in a case where the electronic key is certified and the human body certification information of the person who intends to start the engine is confirmed. When the engine is started, the information that the human body certification information is confirmed is written in the electronic key. After that, the door is unlocked only when the electronic key is certified by the certifying means of the electronic key for getting in the vehicle and the information that the human body certification information is confirmed is written in the electronic key. Under this structure, it is not necessary to confirm the human body certification information of the person getting in the vehicle at the time of unlocking the door for the purpose of ensuring the security regarding unlocking the door. Accordingly, it is possible to make the size of the device simple without reducing the security and achieve a low cost. In addition, since the door is unlocked only when the electronic key is certified by the certifying means of the electronic key for getting in the vehicle and the information that the human body certification information is confirmed is written in the electronic key, it is possible to prevent a decrease in security when the engine is started.

Other objects, features, and advantages of the present invention will become more apparent from the following detailed description when read in conjunction with the accompanying drawings.

BRIEF DESCRIPTION OF THE DRAWINGS

FIG. 3 is a schematic view showing a state transition of an engine start permission counter of the first embodiment;

FIG. 6 is a table showing a maximum permission number of times set for each electronic key, of starting an engine after a vehicle door is locked or a maximum permission number of times of unlocking of the vehicle door after the engine is started; and FIG. 7 is a table showing a maximum permission number set for each person, of starting the engine after the vehicle door is locked.

BEST MODE FOR CARRYING OUT THE INVENTION

A description is next given, with reference to FIG. 1 through FIG. 7, of embodiments of an anti-theft device for a vehicle of the present invention.

First Embodiment

Figure 1:
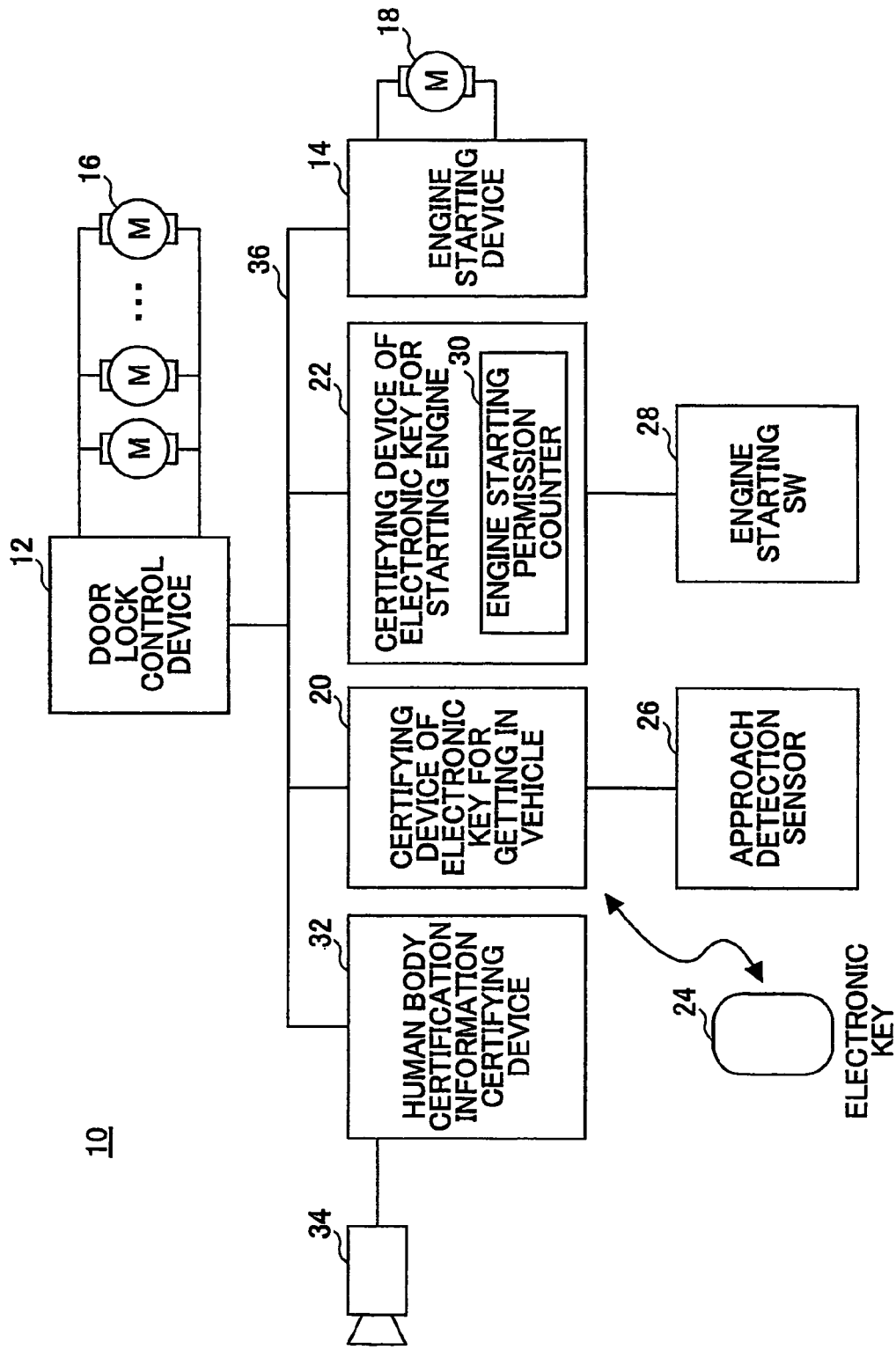
FIG. 1 is a block diagram showing a system structure of an anti-theft vehicle device of a first embodiment of the present invention.

FIG. 1 is a block diagram showing a system structure of an anti-theft vehicle device 10 of a first embodiment of the present invention. As shown in FIG. 1, the anti-theft vehicle device 10 of the first embodiment of the present invention includes a door lock control device 12 and an engine starting device 14 installed in a vehicle. The door lock control device 12 switches locking and unlocking of doors provided in the vehicle by using a door lock motor 16. A separated door lock motor 16 is provided for each vehicle door. The starting device 14 implements starting of an engine provided in the vehicle for vehicle power by using an engine starter 18.

The anti-theft vehicle device 10 further includes a certifying device 20 of an electronic key for getting in a vehicle and a certifying device 22 of an electronic key for starting an engine which are installed in the vehicle, and an electronic key 24 held by a person getting in the vehicle. ID information for identifying the key is installed in the electronic key 24. The electronic key 24 has a function for encoding a signal (hereinafter "response signal") including a designated response code and an ID code of the electronic key 24 based on a request from the outside and for sending them. The certifying device 20 of the electronic key for getting in the vehicle and the certifying device 22 of the electronic key for starting the engine memorize the ID information of the electronic key 24 that is certified and registered in advance to be permitted to be used for the vehicle. The electronic key 24, where the ID information is memorized for a single vehicle and which is certified and registered, is normally plural in numbers because there needs to be a master key, a spare key and others.

An approach detection sensor 26 provided in the vicinity of a door outer handle of a vehicle door is connected to the certifying device 20 of the electronic key for getting in the vehicle. The approach detection sensor 26 includes an antenna for receiving and sending a signal. In a state where the vehicle engine is not running and all of the vehicle doors are locked, the approach detection sensor 26 periodically sends a signal (hereinafter "vehicle room outside request signal") for requesting a response by the electronic key 24 from the antenna toward the outside of the vehicle room in the vicinity of the vehicle door and receives a response signal sent from the electronic key 24. The approach detection sensor 26 detects whether a person having the electronic key 24 exists outside of the vehicle room in the vicinity of the vehicle based on the existence of a receipt of the response signal after the vehicle room outside request signal is sent, so as to detect an approach of a person who intends to get in the vehicle. The certifying device 20 of the electronic key for getting in the vehicle is started working in a case where the approach detection sensor 26 detects the approach of the person who intends to get in the vehicle. The certifying device 20 determines whether the electronic key 24 is a key certified and registered for the vehicle in advance namely whether the electronic key 24 held by the person approaching the vehicle can be certified, by comparing the ID information included in the response signal from the electronic key 24 with the ID of the electronic key certified and registered in advance.

An engine starting switch 28, provided near the steering wheel in the vehicle room so that a driver can operate, is connected to the certifying device 22 of the electronic key for starting the engine.

The engine starting switch 28 is, for example, a pushing pressure type switch for starting the vehicle engine from a driving stop state. The certifying device 22 of the electronic key for starting the engine has an antenna for sending and receiving a signal situated in the vehicle room. The certifying device 22 sends a signal (hereinafter "vehicle room inside request signal") for requesting a response from the electronic key 24 from the antenna toward the inside of the vehicle room in a case where the engine starting switch 28 is turned on for starting the engine, and receives a response signal sent from the electronic key 24. In a case where the certifying device 22 receives the response signal from the electronic key 24 after sending the vehicle room inside request signal, the certifying device 22 determines whether the electronic key 24 is a key certified and registered for the vehicle in advance, namely whether the electronic key 24 held by the person in the vehicle room can be certified, by comparing the ID information included in the response signal from the electronic key 24 with the ID of the electronic key certified and registered in advance.

A counter (hereinafter "engine starting permission counter") 30 indicating the number of permitted times of starting the engine after the vehicle door is unlocked by using a door lock motor 16 is installed in the certifying device 22. The engine starting permission counter 30 has a count value for every electronic key 24, "0" or "1" in this embodiment.

The anti-theft vehicle device 10 further includes a human body certification information certifying device 32 installed in the vehicle. The human body certification information certifying device 32 has a camera 34 for photographing a face which is provided at a body pillar of the vehicle. The camera 34 photographs the face of a person who intends to get in the vehicle from the outside of the vehicle so as to produce a picture. The human body certification information certifying device 32 memorizes, in advance, information about specific features or configurations of all persons who get in the vehicle. In a case where the face of the person who intends to get in the vehicle is photographed by the camera 34, the human body certification information certifying device 32 extracts the specific features or configuration of the face of the person from the photographed picture and compares the extracted face and the faces of persons certified and registered in advance, so as to determine whether the photographed face is a face certified and registered for the vehicle, namely whether the human body certification information of the person who intends to get in the vehicle is confirmed. As discussed above, in this embodiment, the certifying device 32 confirms the human body certification information of the person who intends to get in the vehicle based on the photographed picture by using the camera 34. However, the present invention is not limited to this. The certifying device 32 may confirm the human body certification information of the person who intends to get in the vehicle based on a body specific feature of the person who intends to get in the vehicle such as a fingerprint, iris/retina, or vein.

The above discussed door lock control device 12, the engine starting device 14, the certifying device 20 of the electronic key for getting in the vehicle, the certifying device 22 of the electronic key for starting the engine, and the human body certification information certifying device 32 are connected to each other via a bus 36 so that sending and receiving the information can be implemented.

Figure 2:
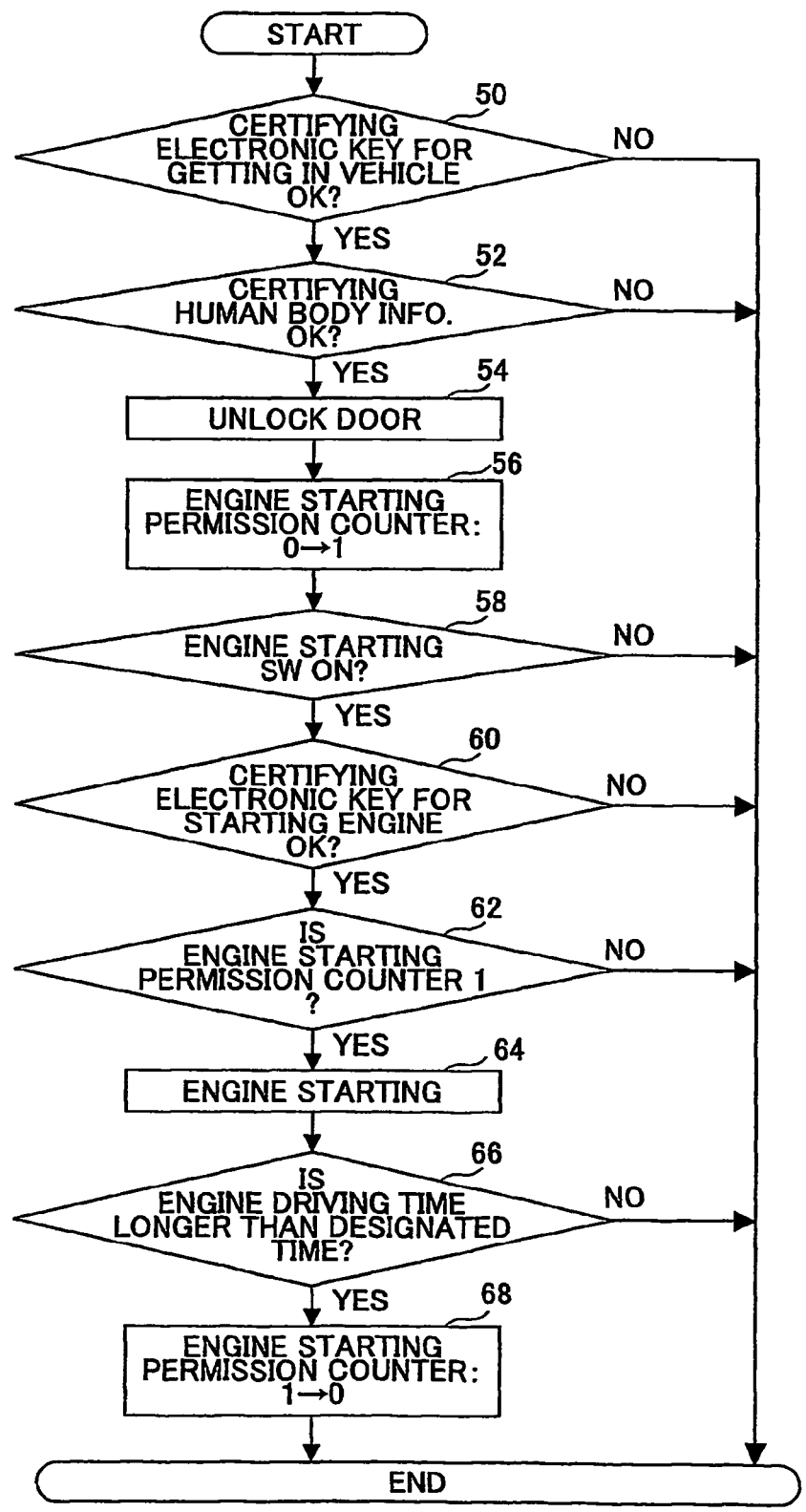
FIG. 2 is a flowchart of a control routine implemented by the anti-theft vehicle device of the first embodiment of the present invention.

Next, an operation of the anti-theft vehicle device 10 of the first embodiment of the present invention is discussed with reference to FIG. 2. FIG. 2 is a flowchart of a control routine implemented by the anti-theft vehicle device 10 of the first embodiment of the present invention.

In this embodiment, in a case where the vehicle engine is not running and all of the vehicle doors are closed and locked, the vehicle room outside reguest signal is periodically sent from the antenna of the approach detection sensor 26 to the outside of the vehicle. If the person having the electronic key 24 approaches the vehicle under this state, the electronic key 24 reacts to the vehicle room outside request signal and sends the response signal including the designated response code and the ID code of the electronic key 24 to the vehicle. In a case where the approach detection sensor 26 does not receive the response signal from the electronic key 24 after sending the vehicle room outside request signal, the approach detection sensor 26 determines that the person does not approach to the vehicle. In a case where the approach detection sensor 26 receives the response signal from the electronic key 24, the approach detection sensor 26 detects that the person approaches the vehicle, and notifies the certifying device 20 that the person approaches the vehicle, and provides to the certifying device 20 the ID information of the electronic key 24.

In a case where the approach of the person to the vehicle is reported by the approach detection sensor 26, the certifying device 20 of the electronic key for getting in the vehicle is started working. The certifying device 20 determines whether the electronic key 24 held by the person approaching the vehicle is certified, by comparing the ID information included in the reported contents with the ID of all of the electronic keys certified and registered in advance (S50). As a result of this, in a case where the ID of the electronic key 24 is not consistent with any of the IDs registered for the vehicle in advance so that it is determined that the electronic key 24 is not confirmed, the process is completed without proceeding to further steps. In a case where the ID of the electronic key 24 is consistent with one of the IDs registered for the vehicle in advance so that it is determined that the electronic key 24 is confirmed, the ID information of the electronic key 24 is memorized and the certifying device 20 notifies to the human body certification information certifying device 32 that the electronic key 24 held by the person who intends to get in the vehicle is confirmed.

In a case where the human body certification information certifying device 32 is notified by the certifying device 20 that the electronic key 24 held by the person who intends to get in the vehicle is confirmed at the time of getting in the vehicle, the camera 34 photographs the face of the person who intends to get in the vehicle. Then the human body certification information certifying device 32 extracts the specific features or configuration of the face of the person from the photographed picture and compares the extracted face and the face of the person certified and registered in advance, so as to determine whether the photographed face is a face certified and registered for the vehicle (S52). As a result of this, in a case where it is determined that the human body certification information is not confirmed, the process is completed without proceeding to further steps. In a case where it is determined that the human body certification information is confirmed, the human body certification information certifying device 32 sends a signal to the door lock control device 12 for instructing that the vehicle door 12 be switched from a locked state to an unlocked state and notifies the certifying device 22 of the electronic key for starting the engine that the human body information of the person who intends to get in the vehicle is confirmed.

In a case where the door lock control device 12 is instructed by the human body certification information device 32 that the vehicle door is to be switched to be unlocked, the door lock control device 12 supplies an instruction signal to the door lock motors 16 corresponding to all of the vehicle doors so that the vehicle doors are unlocked (S54). In this case, all of the locked vehicle doors are unlocked by radio communications between the devices installed in the anti-theft vehicle device 10 and the electronic key 24 held by the person who intends to get in the vehicle. As a result of this, the person who intends to get in the vehicle can open the vehicle door and get in the vehicle room without operating the electronic key 24.

In a case where the certifying device 22 of the electronic key for starting the engine is notified by the human body certification information certifying device 32 that the human body information of the person who intends to get in the vehicle is confirmed, the certifying device 22 supplies a signal for requesting the certifying device 20 to send the ID information of the electronic key 24 held by the person who intends to get in the vehicle for which the confirmation has been done. The certifying device 20 memorizes the ID information of the electronic key 24 held by the person who intends to get in the vehicle. In a case where a signal, requesting to send the ID information of the electronic key 24 memorized at the time when the person approaches the vehicle, is supplied from certifying device 22 to the certifying device 20 after the certifying device 20 reports the confirmation of the electronic key 24 to the human body certification information certifying device 32, the certifying device 20 sends the ID information of the electronic key 24 to the certifying device 22. In a case where the certifying device 22 receives the ID information sent from the certifying device 20 after requesting the certifying device 20 to send the ID information of the electronic key 24, the certifying device 22 changes the counter value indicated by the engine starting counter 30 corresponding to the ID of the electronic key 24 from "0" to "1" (S56).

FIG. 3 is a schematic view showing a state transition of the engine start permission counter 30 of this embodiment.

In a case where the certifying device 22 is notified by the human body certification information certifying device 32 that the human body information of the person who intends to get in the vehicle is confirmed, the certifying device 22 supplies a signal for requesting the certifying device 20 to send the ID information of the electronic key 24, and then the ID information that is "002" of the electronic key 24 sent from the certifying device 20 is received by the certifying device 22, and as shown in FIG. 3, the count value of the engine starting permission counter 30 corresponding to the electronic key 24 whose ID is "002" is changed from "0" to "1".

Next, in a case where the engine starting switch 28 is turned on while the engine is stopped running after the person gets in the vehicle, namely in a case of "yes" in the step 58, the vehicle room inside request signal is sent from the antenna of the certifying device 22 to the inside of the vehicle. Under this state, in a case where a person having the electronic key 24 is inside of the vehicle, that is a person who intends to start the engine has the electronic key 24, the electronic key 24 reacts to the vehicle room inside request signal and sends the response signal including the designated response code and the ID code of the electronic key 24 to the certifying device 22.

In a case where the certifying device 22 does not receive the response signal from the electronic key 24 after sending the vehicle room inside request signal, the certifying device 22 determines that the person who intends to start the engine does not have the electronic key 24. In a case where the certifying device 22 receives the response signal from the electronic key 24, the certifying device 22 detects that the person who intends to start the engine has the electronic key 24, compares the ID information of the electronic key 24 included in the response signal with the IDs of all the electronic keys that are certified and registered in advance, and determines whether the electronic key 24 held by the person who intends to start the engine is confirmed (S60). As a result of this, in a case where the ID of the electronic key 24 is not consistent with the IDs registered for the vehicle in advance so that it is determined that the electronic key 24 is not confirmed, the process is completed without proceeding to further steps. In a case where the ID of the electronic key 24 is consistent with one of the IDs registered for the vehicle in advance so that it is determined that the electronic key 24 is confirmed, the counter value indicated by the engine starting permission counter 30 corresponding to the ID of the electronic key 24 is referred so that whether the counter value is "1" is determined (S62).

In a case where the engine starting permission counter indicates a counter value of not "1" but "0", the counter value has not been changed from "0" to "1" at a door unlock timing, and therefore it is determined that the electronic key 24 held by the person who intends to start the engine is not an electronic key used at the door unlock timing. Therefore, in this case, it is proper not to start the engine even if the electronic key 24 held by the person who intends to start the engine is confirmed. On the other hand, in a case where the engine starting permission counter indicates a counter value of "1", the counter value has been changed from "0" to "1" at a door unlock timing, and therefore it is determined that the electronic key 24 held by the person who intends to start the engine is identical to the electronic key used at the door unlock timing. Therefore, in this case, the engine can be started. In a case where the certifying device 22 determines that the ID of the electronic key 24 is consistent with one of the IDs registered for the vehicle in advance so that the electronic key 24 is confirmed and then that counter value indicated by the engine starting permission counter 30 corresponding to the ID of the electronic key 24 is "1", an instruction signal for starting the engine is supplied to the engine starting device 14.

In a case where the engine starting device 14 is instructed by the certifying device 22 so as to make the engine start, the engine starting device 14 supplies an instruction signal for starting the engine to the engine starter 18 (S64). In this case, the vehicle engine is started so that the vehicle can be driven, by radio communications between the devices installed in the anti-theft vehicle device 10 after the engine starting switch 28 is operated and the electronic key 24 is held by the person who intends to start the engine.

The engine starting device 14 determines whether the engine runs independently from the engine starter 18 after a designated time—(for example s seconds) passes after the engine is started (S66). As a result of this, if the engine starting device 14 determines that the engine is not running, the engine starting device 14 makes the process end. On the other hand, if the engine starting device 14 determines that the engine is running, the engine starting device 14 supplies an instruction signal to the certifying device 22 so that the count value that corresponds to the ID of the designated electronic key 24 and is determined as "1" is decremented to "0". In a case where the certifying device 22 is, after instructing the engine starting device 14 to start the engine, instructed by the engine starting device 14 so that the count value indicated by the engine starting permission counter 30 is decremented, the count value corresponding to the ID of the electronic key 24 which is confirmed at the engine starting time is reset to "0" (S68).

Under the structure of the above discussed anti-theft vehicle device 10, the unlocking of the locked vehicle door is realized when the electronic key 24 held by the person who intends to get in the vehicle is confirmed to be consistent with a key certified and registered to the vehicle side in advance and when the human body certification information of the person is confirmed to be consistent with the information certified and registered to the vehicle side in advance. That is, even if the person who intends to get in the vehicle has the electronic key 24, as long as the electronic key 24 is not certified and registered at the vehicle side or the human body certification information is not certified and registered at the vehicle side, the vehicle door is not unlocked. Therefore, according to this embodiment, it is possible to ensure high security regarding unlocking the vehicle door.

In addition, under the structure of the above discussed anti-theft vehicle device 10, the engine is started when the electronic key 24 held by the person who intends to start the engine is confirmed to be consistent with a key certified and registered to the vehicle side in advance and when the electronic key 24 is an electronic key permitted to start the engine based on the counter value of the engine starting permission counter 30. That is, even if the person who intends to get in the vehicle and start the engine has the electronic key 24, as long as the electronic key 24 is not certified and registered at the vehicle side or the electronic key 24 is not a key permitted to start the engine while the human body certification information is certified and registered at the vehicle side, the vehicle engine is not started.

The electronic key 24 permitted to start the engine is an electronic key having an ID wherein the counter value of the engine starting permission counter 30 is changed to "1" when the vehicle door is unlocked by confirming the ID of the electronic key 24 and the human body certification information. Not only that the electronic key 24 held by the person who intends to start the engine is confirmed that it is consistent with a key certified and registered to the vehicle side in advance but also that the electronic key 24 is an electronic key permitted to start the engine, are conditions for starting the engine. Hence, it is possible to realize the same effect as an effect achieved by confirming again the human body certification information for starting the engine. Therefore, according to this embodiment, as compared with a structure where the engine is started only when the electronic key 24 held by the person who intends to start the engine is confirmed that it is consistent with a key certified and registered to the vehicle side, it is possible to achieve a higher security level for starting the vehicle engine.

Furthermore, under this structure, it is not necessary to confirm the human body certification information of the person getting in the vehicle at the time of starting the engine for the purpose of ensuring security regarding the starting of the engine. Accordingly, it is not necessary to separately provide a human body certification information certifying device for door unlocking and a human body certification information certifying device for starting the engine. As for the entirety of the anti-theft vehicle device 10 which unlocks the door and starts the engine, it is possible to make the size of the device small without reducing security and to achieve a low cost.

Thus, according to the anti-theft vehicle device 10 of this embodiment, it is possible to realize unlocking the door of the vehicle and starting the engine with a simple structure and without reducing the security by commonly confirming the human body certification information. Therefore, it is possible to securely prevent the theft of the vehicle based on unlocking of the door or starting the engine by a suspicious person, with a simple structure.

In this embodiment, when the count value indicated by the engine starting permission counter 30 is "1", the vehicle engine is permitted to be started. When the count value is reset to "0", the engine is prevented from starting as long as the state of the vehicle door is not switched from locked to unlocked by the above-mentioned method. This count value is changed from "0" to "1" at the time when the vehicle door is unlocked by confirming the ID of the electronic key 24 held by the person who intends to get in the vehicle and confirming the human body certification information of the person. After that, the count values is reduced only when the engine is run after a designated time passes after the engine is started, and is reset to "0". That is, even if the engine is started, as long as time for running the engine is short, the count value is not reset to "0". Therefore, in a case where the engine fails to start due to the atmosphere outside of the vehicle or other conditions, it is possible to ensure to restarting the engine without preventing starting the engine and thereby usefulness to a person getting in the vehicle can be improved. Furthermore, in a case where the electronic key 24 is stolen after the door is unlocked, since the engine can be started only one time, it is possible to prevent the value of the use of the vehicle from being reduced.

Furthermore, as described above, under a structure where the count value of the engine starting permission counter 30 is not reset when the running time of the engine after the engine is started is short, it is possible to make a maximum number of times for permitting starting the engine after door unlocking, under consideration of failure of the starting of the engine, as small as possible.

In the first embodiment, the certifying device 20 of the electronic key for getting in the vehicle corresponds to "certifying means of an electronic key for getting in a vehicle" in claims, the human body certification information certifying device 32 corresponds to "human body certification information certifying means" in claims, the door lock control device 12 corresponds to "door lock control means" in claims, the engine starting permission counter 30 corresponds to "memory means" in claims, the certifying device 22 of the electronic key for starting the engine corresponds to "certifying means of an electronic key for starting an engine", and the engine starting device 14 corresponds to "engine starting control means" in claims, and a function whereby an instruction signal for decrementing the count value corresponding to the ID of the specific electronic key 24 of the engine starting permission counter 30 to "0" is supplied from the engine starting device 14 to the certifying device 22 corresponds to a function of "permission number reducing means" in claims.

Meanwhile, in the above-discussed first embodiment, the count value of the engine starting permission counter 30 is set as "1" at the time of door unlocking and then the count value is reset under the consideration of the failure of the engine starting in a case where the running time after the engine is started is relatively long. However, the present invention is not limited to this. The count value of the engine starting permission counter 30 may be set as a designated value more than "2" at the time of door unlocking and then the count value may be decremented every time when the engine is started. Under this structure, it is possible to permit starting the engine plural time after the door is unlocked and to restart the engine after the failure of starting the engine, so that it is possible to improve the convenience to the person getting in the vehicle.

In the first embodiment, the count value of the engine starting permission counter 30 is reset in a case where the running time after the engine is started is relatively long. But, the present invention is not limited to this. The count value of the engine starting permission counter 30 may be reset in a case where a rotation number of the engine reaches a designated number or a distance driven by the vehicle after the engine is started reaches the designated distance.

Second Embodiment

Figure 4:
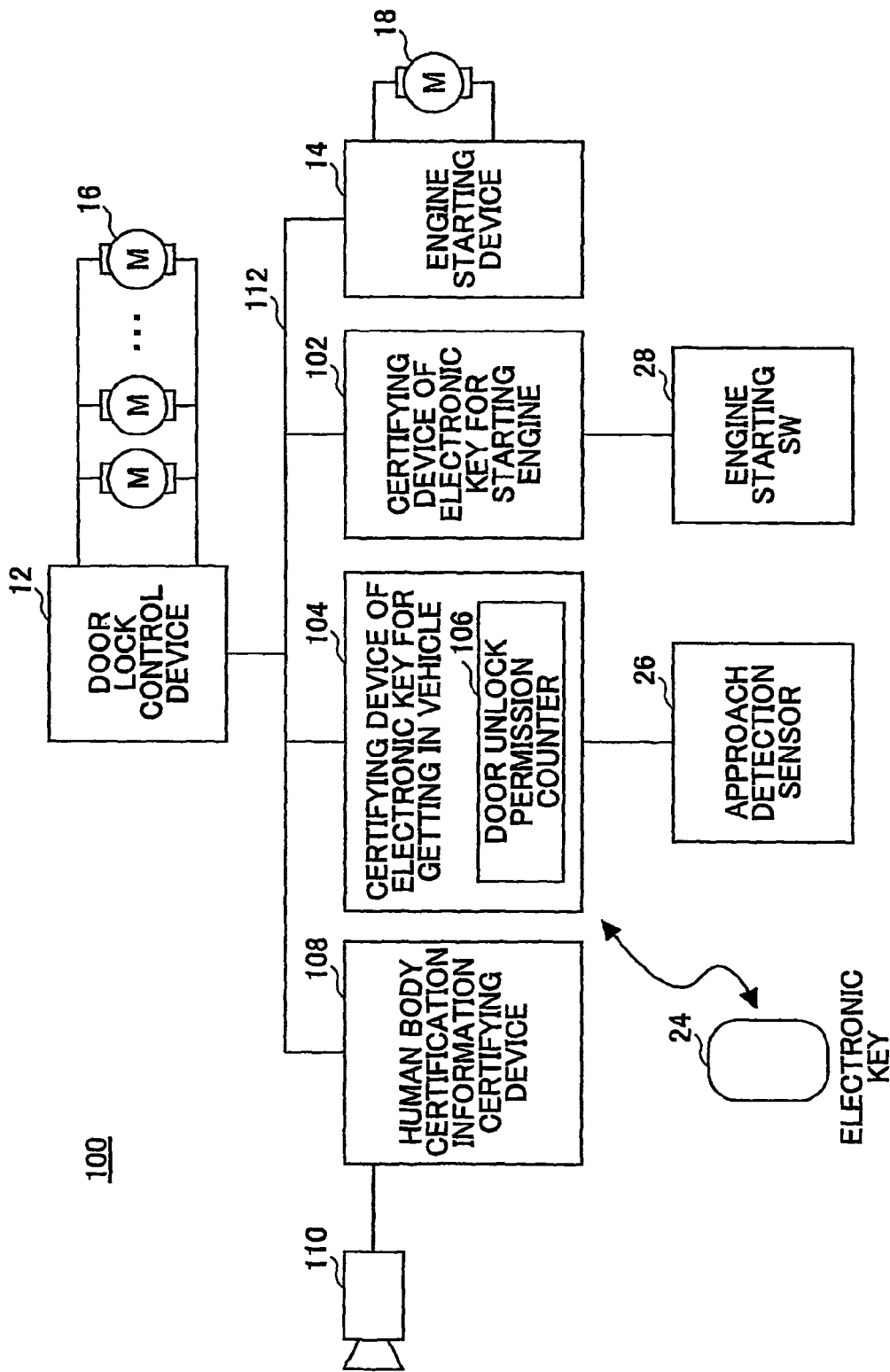
FIG. 4 is a block diagram showing a system structure of an anti-theft vehicle device of a second embodiment of the present invention.

FIG. 4 is a block diagram showing a system structure of an anti-theft vehicle device 100 of the second embodiment of the present invention. In FIG. 4, parts that are the same as the parts shown in FIG. 1 are given the same reference numerals, and explanation thereof is omitted. As shown in FIG. 4, the anti-theft vehicle device 100 of the second embodiment of the present invention includes the door lock control device 12, the engine starting device 14, a certifying device 102 of an electronic key for starting an engine and a certifying device 104 of an electronic key for getting in a vehicle which are installed in the vehicle, and the electronic key 24 held by the person getting in the vehicle. The certifying device 104 of the electronic key for getting in the vehicle and the certifying device 102 of the electronic key for starting the engine memorize the ID information of the electronic key 24 that is certified and registered in advance to be permitted to be used for the vehicle.

An engine starting switch 28 is connected to the certifying device 102 of the electronic key for starting the engine. The certifying device 102 of the electronic key for starting the engine has an antenna for sending and receiving a signal situated in the vehicle room. The certifying device 102 sends a vehicle room inside request signal from the antenna toward the inside of the vehicle room in a case where the engine starting switch 28 is turned on for starting the engine, and receives a response signal sent from the electronic key 24. In a case where the certifying device 102 receives the response signal from the electronic key 24 after sending the vehicle room inside request signal, the certifying device 102 determines whether the electronic key 24 is a key certified and registered for the vehicle in advance, namely whether the electronic key 24 held by the person in the vehicle room can be certified, by comparing the ID information included in the response signal from the electronic key 24 with the ID of the electronic key certified and registered in advance.

An approach detection sensor 26 is connected to the certifying device 104 of the electronic key for getting in the vehicle. The certifying device 104 of the electronic key for getting in the vehicle is started working in a case where the approach detection sensor 26 detects the approach of a person who intends to get in the vehicle. The certifying device 104 determines whether the electronic key 24 is a key certified and registered for the vehicle in advance, namely whether the electronic key 24 held by the person approaching the vehicle can be certified, by comparing the ID information included in the response signal from the electronic key 24 with the ID of the electronic key certified and registered in advance.

A counter (hereinafter "door unlocking permission counter") 106 indicating the number of permitted times of unlocking of the vehicle door after the vehicle engine is started by using the engine starter 18 is installed in the certifying device 104. The door unlocking permission counter 106 has a count value for every electronic key 24, "0" or "1" in this embodiment.

The anti-theft vehicle device 100 further includes a human body certification information certifying device 108 installed in the vehicle. The human body certification information certifying device 108 has a camera 110 for photographing a face which is provided at a body pillar of the vehicle. The camera 110 photographs the face of a person who intends to get in the vehicle from the outside of the vehicle so as to produce a picture. The human body certification information certifying device 108 memorizes, in advance, information about specific features or configurations of all of the persons who may get in the vehicle. In a case where the face of the person who intends to get in the vehicle is photographed by the camera 110, the human body certification information certifying device 108 extracts the specific features or configuration of the face of the person from the photographed picture and compares the extracted face and a face of the person certified and registered in advance, so as to determine whether the photographed face is a face certified and registered for the vehicle, namely whether the human body certification information of the person who intends to get in the vehicle is confirmed. As discussed above, in this embodiment, the certifying device 108 confirms the human body certification information of the person who intends to get in the vehicle based on the photographed picture by using the camera 110. However, the present invention is not limited to this. The certifying device 108 may confirm the human body certification information of the person who intends to get in the vehicle based on a body specific feature of the person who intends to get in the vehicle such as a fingerprint, iris/retina, or vein.

The above discussed door lock control device 12, the engine starting device 14, the certifying device 104 of the electronic key for getting in the vehicle, the certifying device 102 of the electronic key for starting the engine, and the human body certification information certifying device 108 are connected to each other via a bus 112 so that sending and receiving the information can be implemented.

Figure 5:
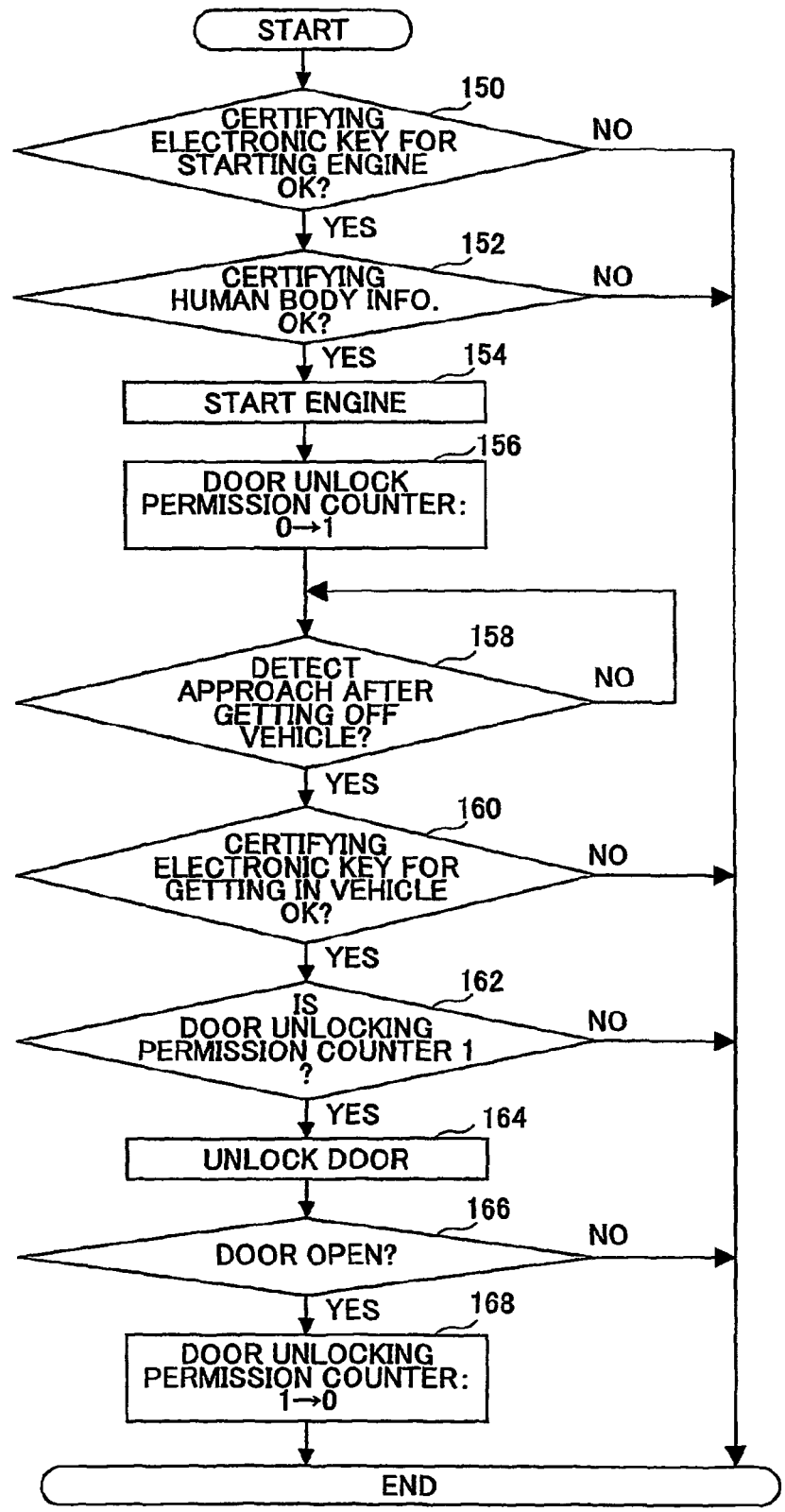
FIG. 5 is a flowchart of a control routine implemented by the anti-theft vehicle device of the second embodiment of the present invention.

Next, an operation of the anti-theft vehicle device 100 of the second embodiment of the present invention is discussed with reference to FIG. 5. FIG. 5 is a flowchart of a control routine implemented by the anti-theft vehicle device 100 of the second embodiment of the present invention.

In this embodiment, when the engine starting switch 28 is turned on while the engine is stopped running after the person gets in the vehicle, namely in a case of "yes" in the step 58 (FIG. 2), the vehicle room inside request signal is sent from the antenna of the certifying device 102 to the inside of the vehicle. Under this state, in a case where a person having the electronic key 24 is inside of the vehicle, that is a person who intends to start the engine has the electronic key 24, the electronic key 24 reacts to the vehicle room inside request signal and sends the response signal including the designated response code and the ID code of the electronic key 24 to the certifying device 102.

In a case where the certifying device 102 does not receive the response signal from the electronic key 24 after sending the vehicle room inside request signal, the certifying device 102 determines that the person who intends to start the engine does not have the electronic key 24. In a case where the certifying device 102 receives the response signal from the electronic key 24, the certifying device 102 detects that the person who intends to start the engine has the electronic key 24, compares the ID information of the electronic key 24 included in the response signal with the IDs of all of the electronic keys that are certified and registered in advance, and determines whether the electronic key 24 held by the person who intends to start the engine is confirmed (S150). As a result of this, in a case where the ID of the electronic key 24 is not consistent with the ID registered for the vehicle in advance so that it is determined that the electronic key 24 is not confirmed, the process is completed without proceeding to further steps. In a case where the ID of the electronic key 24 is consistent with the ID registered for the vehicle in advance so that it is determined that the electronic key 24 is confirmed, the certifying device 102 memorizes the ID information of the electronic key 24 and reports the confirmation of the electronic key 24 held by the person who intends to start the engine, to the human body certification information certifying device 108.

In a case where the human body certification information certifying device 108 is notified by the certifying device 102 that the electronic key 24 held by the person who intends to get in the vehicle is confirmed at the time when the engine is started, the camera 110 photographs the face of the person who intends to get in the vehicle. Then the human body certification information certifying device 108 extracts the specific feature or configuration of the face of the person from the photographed picture and compares the extracted face and the face of the person certified and registered in advance, so as to determine whether the photographed faces is a face certified and registered for the vehicle (S152). As a result of this, in a case where it is determined that the human body certification information is not confirmed, the process is completed without proceeding to further steps. In a case where it is determined that the human body certification information is confirmed, the human body certification information certifying device 108 sends a signal to the engine starting device 14 for instructing that the engine be started and notifies the certifying device 104 that the human body information of the person who intends to start the engine is confirmed.

In a case where the engine starting device 14 is instructed by the certifying device 108 so as to make the engine start, the engine starting device 14 supplies an instruction signal for starting the engine to the engine starter 18 (S154). In this case, the vehicle engine is started so that the vehicle can be driven, by radio communication between the devices installed in the anti-theft vehicle device 10 after the engine starting switch 28 is operated and the electronic key 24 held by the person who intends to start the engine.

In a case where the certifying device 104 of the electronic key for getting in the vehicle is notified by the human body certification information certifying device 108 that the human body information of the person who intends to start the engine is confirmed, the certifying device 104 supplies a signal for requesting the certifying device 102 to send the ID information of the electronic key 24 held by the person who intends to start the engine for which the confirmation has been done. The certifying device 102 memorizes the ID information of the electronic key 24 held by the person who intends to start the engine. In a case where a signal, requesting to send the ID information of the electronic key 24 memorized at the time when the engine is started, is supplied from the certifying device 104 to the certifying device 102 after the certifying device 102 reports the confirmation of the electronic key 24 to the human body certification information certifying device 108, the certifying device 102 sends the ID information of the electronic key 24 to the certifying device 104. In a case where the certifying device 104 receives the ID information sent from the certifying device 102 after requesting the certifying device 102 to send the ID information of the electronic key 24, as shown in FIG. 3, the certifying device 102 changes the counter value indicated by the door unlocking permission counter 106 corresponding to the ID of the electronic key 24 from "0" to "1" (S156).

Next, in a case where the vehicle engine is stopped running, the person in the vehicle gets out of the vehicle, all of the vehicle doors are locked, and the vehicle room outside request signal is periodically sent from the antenna of the approach detection sensor 26 connected to the certifying device 104 to the outside of the vehicle. If the person having the electronic key 24 approaches the vehicle under this state, the electronic key 24 reacts to the vehicle room outside request signal and sends the response signal including the designated response code and the ID code of the electronic key 24 to the vehicle. In a case where the approach detection sensor 26 does not receive the response signal from the electronic key 24 after sending the vehicle outside request signal, the approach detection sensor 26 determines that the person does not approach the vehicle. In a case where the approach detection sensor 26 receives the response signal from the electronic key 24, the approach detection sensor 26 detects that the person approaches the vehicle and notifies the certifying device 104 that the person approaches the vehicle and provide to the certifying device 104 the ID information of the electronic key 24 (S158).

The certifying device 104 is started when receiving the notification of the approach of the person to the vehicle from the approach detection sensor 26. The certifying device 104 compares the ID information of the electronic key 24 included in the notification with the IDs of all of electronic keys that are certified and registered in advance, and determined whether the electronic key 24 held by the person who approaches the vehicle is confirmed (S160). As a result of this, in a case where the ID of the electronic key 24 is not consistent with any of the IDs registered for the vehicle in advance so that it is determined that the electronic key 24 is not confirmed, the process is completed without proceeding to further steps. In a case where the ID of the electronic key 24 is consistent with one of the IDs registered for the vehicle in advance so that it is determined that the electronic key 24 is confirmed, the counter value indicated by the door locking permission counter 106 corresponding to the ID of the electronic key 24 is referred to so that whether the counter value is "1" is determined (S162).

In a case where the door locking permission counter indicates a counter value of not "1" but "0", the counter value has not been changed from "0" to "1" at a door unlock timing, and therefore it is determined that the electronic key 24 held by the person who intends to get in the vehicle is not the electronic key used for the engine starting. Therefore, in this case, it is proper not to unlock the door even if the electronic key 24 held by the person who intends to get in the vehicle is confirmed. On the other hand, in a case where the door locking permission counter indicates a counter value of "1", the counter value has been changed from "0" to "1" at the engine starting, and therefore it is determined that the electronic key 24 held by the person who intends to get in the vehicle is identical to the electronic key used for the engine starting. Therefore, in this case, the door can be unlocked. In a case where the certifying device 104 determines that the ID of the electronic key 24 is consistent with the ID registered for the vehicle in advance so that the electronic key 24 is confirmed and then the counter value indicated by the door unlocking permission counter 106 corresponding to the ID of the electronic key 24 is "1", a instruction signal for switching the state of the door from a locking state to an unlocking state is supplied to the door locking control device 12.

In a case where the door lock control device 12 is instructed by the certifying device. 104 that the vehicle door is to be switched to unlocked, the door lock control device 12 supplies a instruction signal to the door lock motors 16 corresponding to all of the vehicle doors so that the vehicle doors are unlocked (S164). In this case, all of the locked vehicle doors are unlocked by radio communications between the devices installed in the anti-theft vehicle device 100 and the electronic key 24 held by the person who intends to get in the vehicle. As a result of this, the person who intends to get in the vehicle can open the vehicle door and get in the vehicle room without operating the electronic key 24.

The door locking control device 12 determines whether the door is opened after the door is unlocked (S166). As a result of this, if the door locking control device 12 determines that no door is opened, the door locking control device 12 makes the process end. On the other hand, if the door locking device 12 determines that any door is opened, the door locking device 12 supplies an instruction signal to the certifying device 104 so that the count value that corresponds to the ID of the designated electronic key 24 and is determined as "1" is decremented to "0". In a case where the certifying device 104 is, after instructing the door locking control device 12 to unlock the door, instructed by the door locking device 12 so that the count value indicated by the door unlocking permission counter 106 is decremented, the count value corresponding to the ID of the electronic key 24 which is confirmed at the engine starting time is reset to "0" (S168).

Under the structure of the above discussed anti-theft vehicle device 100, the engine is started when the electronic key 24 held by the person who intends to start the engine is confirmed to be consistent with a key-certified and registered to the vehicle side in advance and when the human body certification information of the person is confirmed to be consistent with the information certified and registered to the vehicle side in advance. That is, even if the person who intends to get in the vehicle and start the engine has the electronic key 24, as long as the electronic key 24 is not certified and registered at the vehicle side or the human body certification information is not certified and registered at the vehicle side, the vehicle engine is not started. Therefore, according to this embodiment, it is possible to ensure high security pertaining unlocking the vehicle door.

Under the structure of the above discussed anti-theft vehicle device 100, the unlocking of the locked vehicle door is realized when the electronic key 24 held by the person who intends to get in the vehicle is confirmed to be consistent with a key certified and registered to the vehicle side in advance and when the electronic key 24 is an electronic key permitted to unlock the door based on the counter value of the door unlocking permission counter 106. That is, even if the person who intends to get in the vehicle has the electronic key 24, as long as the electronic key 24 is not certified and registered at the vehicle side or the electronic key 24 is not a key permitted to unlock the door while the human body certification information is certified and registered at the vehicle side, the vehicle door is not unlocked.

The electronic key 24 permitted to unlock the door is an electronic key having an ID wherein the counter value of the door unlock permission counter 106 is changed to "1" when the engine is started by confirming the ID of the electronic key 24 and the human body certification information. Not only that the electronic key 24 held by the person who intends to get in the vehicle is confirmed to be consistent with a key certified and registered to the vehicle side in advance, but also that the electronic key 24 is an electronic key permitted to unlock the door, are conditions for unlocking the door. Hence, it is possible to realize the same effect as an effect achieved by confirming again the human body certification information for unlocking the door. Therefore, according to this embodiment, as compared with a structure where the door is unlocked only when the electronic key 24 held by the person who intends to get in the vehicle is confirmed that it is consistent with a key certified and registered to the vehicle side, it is possible to achieve a higher security level for unlocking the door.

Furthermore, under this structure, it is not necessary to confirm the human body certification information of the person getting in the vehicle at the time of unlocking the door for the purpose of ensuring security regarding unlocking the door. Accordingly, it is not necessary to separately provide a human body certification information certifying device for door unlocking and a human body certification information certifying device for starting the engine. As for the entirety of the anti-theft vehicle device 100 which unlocks the door and starts the engine, it is possible to make the size of the device small without reducing security and to achieve a low cost.

Thus, according to the anti-theft vehicle device 100 of this embodiment, it is possible to realize unlocking the door of the vehicle and starting the engine with a simple structure and without losing security by commonly confirming the human body certification information. Therefore, it is possible securely prevent the theft of the vehicle based on unlocking the door or starting the engine by a suspicious person, with a simple structure.

In this embodiment, when the count value indicated by the door unlocking permission counter 106 is "1", the door is permitted to be unlocked. When the count value is reset to "0", the door is prevented from being unlocked as long as the engine has not been started by the above-mentioned method. This count value is changed from "0" to "1" at the time when the engine is started by confirming the ID of the electronic key 24 held by the person who intends to start the engine and confirming the human body certification information of the person. After that, the count value is reduced and is reset to "0" only when the engine is stopped, the person is gets out, the door is locked, the door is unlocked, and then the door is opened. That is, even if the door is unlocked, as long as the door is not opened, the count value is not reset to "0". Therefore, in a case where the door is locked after being unlocked but not opened, it is possible to ensure security regarding unlocking the door without preventing unlocking the door and thereby usefulness to a person getting in the vehicle can be improved. Furthermore, in a case where the electronic key 24 is stolen after the engine is started, since unlocking the door is permitted only one time, it is possible to prevent the vehicle from being stolen and prevent the value of the use of the vehicle from being reduced.

Furthermore, as described above, under a structure where the count value of the door unlocking permission counter 106 is not reset when the door is not opened after being unlocked, it is possible to make a maximum number of times for permitting unlocking the door after the engine is started as small as possible.

In the second embodiment, the certifying device 102 of the electronic key for starting the engine corresponds to "certifying means of an electronic key for starting an engine", and the certifying device 104 of the electronic key for getting in the vehicle corresponds to "certifying means of an electronic key for getting in a vehicle" in claims, the door unlocking permission counter 106 corresponds to "memory means" in claims, and a function whereby an instruction signal for decrementing the count value corresponding to the ID of the specific electronic key 24 of the door unlocking permission counter 106 to "0" is supplied from the door locking control device 12 to the certifying device 104 corresponds to a function of "permission number reducing means" in claims.

Meanwhile, in the above-discussed second embodiment, the count value of the door unlocking permission counter 30 is set as "1" at the time of starting the engine and then the count value is reset after the engine is stopped, the door is locked and unlocked and then opened. However, the present invention is not limited to this. The count value of the door unlocking permission counter 106 may be set as a designated value more than "2" at the time of starting the engine and then the count value may be decremented every time when the door is unlocked. Under this structure, it is possible to permit unlocking the door plural times after the engine is started or unlocking the door again after the failure of unlocking the door, so that it is possible to improve the convenience to the person getting in the vehicle.

In the above-mentioned first and second embodiments, regardless of whether the electronic key 24 is a master key or a spare key, the count value of the engine starting permission counter 30 is set as "1" at the time of door unlocking or the count value of the door unlocking permission counter 106 is set as "1" at the time of engine starting. A set value (maximum value) larger than "1" of the engine starting permission counter 30 or the door unlocking permission counter 106, set for every electronic key 24, may be memorized and the counter value may be set to the maximum value for every electronic key 24.

For example, in a case of a test ride at a vehicle seller (car dealer), assuming that an electronic key 24 held by a staff member of the dealer is different from an electronic key 24 used for the user, as shown in FIG. 6, a maximum number of the counter values of the counters 30 and 106 against the electronic key 24 (ID; 001, 002) held by the staff member of the dealer is set as plural time such as 10 times or 100 times. On the other hand, a maximum number of the counter values of the counters 30 and 106 against the electronic key 24 (ID; 003 through 00X) held by the user is set as a single time or two times. The staff member of the dealer frequently moves the vehicle and exhibits the vehicle without locking the door of the vehicle whose engine is stopped during business hours. In addition, in a case where the locked vehicle door is unlocked, the inside of the vehicle may be cleaned without starting the engine. On the other hand, since the user generally gets in the vehicle and then starts driving the vehicle, it seldom happens that the user often gets in and out the vehicle or that the engine is often repeatedly started and stopped. Therefore, as described above, if the maximum value of the count value is different for every electronic key 24, plural times of starting the engine after the door is unlocked or plural times of unlocking the door after the engine is started can be permitted for every electronic key 24, and for different numbers of times. Therefore, it is possible to realize engine starting or door unlocking suitable for each of the persons getting in the vehicle.

In the above mentioned example, maximum numbers of the counter values of the counters 30 and 106 set for every electronic key 24 are memorized and the count value is set to the maximum value used for every electronic key 24. Maximum numbers of the counter values of the counters 30 and 106 set for every person whose human body certification information is confirmed are memorized and the count value is set to the maximum value for every person whose human body certification information is confirmed at the time when the door is unlocked or the engine is started. In this case, the count value corresponding to the electronic key 24 used when the human body certification information is confirmed is set and then it is determined whether the electronic key 24 is an electronic key which is permitted for starting the engine or unlocking the door at the time of starting the engine or unlocking the door.

For example, as shown in FIG. 7, for a vehicle for a family, a maximum number for permitting the engine being started after the door is unlocked, namely the maximum number of the counter value of the counter 30, is set, a maximum number corresponding to a person whose human body certification information is confirmed at the time of door unlocking is read, and the maximum number is memorized by linking with an ID of the electronic key 24 used for door unlocking. The maximum number of times of starting the engine, corresponding to the person memorized corresponding to the electronic key 24, is permitted. Under this structure, even if the door is permitted to be unlocked by a person who is under 18 years old and prohibited from driving, it is possible to prevent the engine from being started. Therefore, as described above, if the maximum value of the count value is different for every person, it is possible to permit different plural times of starting the engine after unlocking the door or the door unlocking after the engine is started, for every person whose human body certification information is confirmed. Hence, it is possible to realize starting the engine or unlocking the door for every person getting in the vehicle.

In the above-mentioned first and second embodiments, at the time of door unlocking and starting the engine in a case where the electronic key 24 is confirmed and the human body certification information is confirmed, the count values of the counters 30 and 106 corresponding to ID of the electronic key 24 are set "1" so that the ID information of the electronic key 24 is memorized at the vehicle side. Since future starting of the engine or unlocking the door is permitted at the time of door locking or starting the engine, the information that the human body certification information is confirmed may be read or deleted from the electronic key 24. Under this structure, for realizing starting the engine by using the electronic key 24 after the door is unlocked, it is necessary for the electronic key 24 for starting the engine to be an electronic key where the information is written at the time when the door is unlocked. Hence, it is possible to obtain the same effect as an effect achieved by reconfirming the human body certification information at the time of starting the engine.

Accordingly, it is not necessary to separately provide the human body certification information certifying device for door unlocking and the human body certification information certifying device for starting the engine. As the entirely of the anti-theft vehicle device 10 or 100 which unlocks the door and starts the engine, it is possible to make the size of the device small without reducing—security and to achieve a low cost.

In this case, information about the maximum number of times for permitting starting the engine or unlocking the door may be written in at the time when the human body certification information is confirmed as being written in the electronic key 24. In addition, as for the count values in the first and second embodiments, the information may be deleted or the number of permissions may be reduced when a designated time for continuing running the engine passes or the unlocked door is opened.

In the above-discussed first and second embodiments, a system where a so-called "smart key" that is an electronic key not requiring a human operation for communication with a vehicle machine side is employed is used. However, the present. invention is not limited to this. The present invention can be applied to a system where an electronic key requiring a human operation for communication with a vehicle machine side is employed can be used.

The present invention is not limited to these embodiments, but variations and modifications may be made without departing from the scope of the present invention.

The invention claimed is:

1. An anti-theft system for a vehicle, comprising:
   a certifying device of an electronic key for getting in the vehicle, the certifying device certifying the electronic key held by a person who intends to get in the vehicle;
   a human body certification information certifying device that confirms human body certification information of the person;
   a door lock control device that unlocks a vehicle door in a case where the electronic key is certified by the certifying device of the electronic key for getting in the vehicle and the human body certification information of the person is confirmed by the human body certification information certifying device in a state where the door is locked;
   a memory that memorizes ID information of the electronic key when the vehicle door is unlocked by the door lock control device based on the electronic key being certified by the certifying device of the electronic key for getting in the vehicle and the human body certification information of the person being confirmed by the human body certification information certifying device;
   a certifying device of an electronic key for starting an engine, the certifying device certifying the electronic key based on a detection by an approaching detection sensor and reception of a response signal sent from the electronic key held by a person who intends to start the engine; and
   an engine starting switch that starts the engine of the vehicle if the electronic key is certified by the certifying device of the electronic key for starting the engine and the electronic key is an electronic key whose ID information is memorized in the memory, without performing human body certification, after the vehicle door is unlocked by the door lock control device,
   wherein the engine starting switch does not start the engine of the vehicle if the electronic key is certified by the certifying device of the electronic key for starting the engine but the electronic key is an electronic key whose ID information is not memorized in the memory, after the vehicle door is unlocked by the door lock control device.

2. The anti-theft system for a vehicle as claimed in claim 1, wherein the memory memorizes, in advance, a maximum number of times for permitting starting the engine after the door is unlocked by the door lock control device, and the engine starting switch allows for starting of the engine for the permitted maximum number of times memorized in the memory by the electronic key which is certified by the certifying device of the electronic key for starting the engine and whose ID information is memorized in the memory, after the door is unlocked by the door lock control device.

3. The anti-theft system for a vehicle as claimed in claim 2, wherein the memory memorizes, in advance, a maximum number of times for permitting starting of the engine after the door is unlocked by the door lock control device, the maximum number being set for every electronic key which is certified and registered, and the engine starting switch allows for starting of the engine for the permitted maximum number of times memorized in the memory by the electronic key which is certified by the certifying device of the electronic key for starting the engine and whose ID information is memorized in the memory, the maximum number corresponding to the electronic key and being memorized in the memory, after the door is unlocked by the door lock control means.

4. The anti-theft system for a vehicle as claimed in claim 1, wherein the memory memorizes, in advance, a maximum number of times for permitting starting of the engine after the door is unlocked by the door lock control device, the maximum number being set for every person who is certified and registered, and the engine starting control device allows for starting of the engine for the permitted maximum number of times memorized in the memory by the electronic key which is certified by the certifying device of the electronic key for starting the engine and whose ID information is memorized in the memory, the maximum number corresponding to the person whose human body certification information is confirmed by the human body information certifying device at the time when the door is unlocked by the door lock control means, the maximum number being memorized in the memory, after the door is unlocked by the door lock control means.

5. The anti-theft system for a vehicle as claimed in claim 2, wherein the engine starting switch includes a permission counter that reduces the number of times permission is granted to start the engine by using the electronic key which is certified by the certifying device of the electronic key for starting the engine and whose ID information is memorized in the memory, when a designated time during which the engine is continued to be run passes.

6. An anti-theft system for a vehicle, comprising:
a certifying device of an electronic key for getting in the vehicle, the certifying device certifying the electronic key held by a person who intends to get in the vehicle;
a human body certification information certifying device for confirming human body certification information of the person;
a door lock control device for unlocking a vehicle door in a case where the electronic key is certified by the certifying device of the electronic key for getting in the vehicle and the human body certification information of the person is confirmed by the human body certification information certifying device in a state where the door is locked;
a writing device that writes information that the human body certification information is confirmed in the electronic key as readable or delete-able information, when the vehicle door is unlocked by the door lock control device based on the electronic key being certified by the certifying device of the electronic key for getting in the vehicle and the human body certification information of the person being confirmed by the human body certification information certifying device;
a certifying device of an electronic key for starting an engine, the certifying device certifying the electronic key based on a detection by an approaching detection sensor and reception of a response signal sent from the electronic key held by a person who intends to start the engine; and
an engine starting switch that starts the engine of the vehicle if the electronic key is certified by the certifying device of the electronic key for starting the engine and the information that the human body certification information is certified is written in the electronic key, without performing human body certification, after the vehicle door is unlocked by the door lock control device,
wherein the engine starting switch does not start the engine of the vehicle if the electronic key is certified by the certifying device of the electronic key for starting the engine but the information that the human body certification information is certified is not written in the electronic key, after the vehicle door is unlocked by the door lock control device.

7. An anti-theft system for a vehicle, comprising:
a certifying device of an electronic key for starting a vehicle engine, the certifying device certifying the electronic key held by a person who intends to start the vehicle;
a human body certification information certifying device for confirming human body certification information of the person;
an engine starting switch that starts the engine in a case where the electronic key is certified by the certifying device of the electronic key for starting the engine and the human body certification information of the person is confirmed by the human body certification information certifying device in a state where the engine has stopped running;
a memory that memorizes ID information of the electronic key when the engine is started by the engine starting switch based on the electronic key being certified by the certifying device of the electronic key for starting the engine and the human body certification information of the person being confirmed by the human body certification information certifying device;
a certifying device of an electronic key for starting an engine, the certifying device certifying the electronic key based on a detection by an approaching detection sensor and reception of a response signal sent from the electronic key held by a person who intends to start the engine; and
a door locking control device that unlocks the door if the electronic key is certified by the certifying device of the electronic key for starting the engine and the electronic key is an electronic key whose ID information is memorized in the memory, without performing human body certification, after the engine is started by the engine starting switch,
wherein the door locking control device does not unlock the door of the vehicle if the electronic key is certified by the certifying device of the electronic key for starting the engine but the electronic key is an electronic key whose ID information is not memorized in the memory, after the engine is started by the engine starting switch.

8. The anti-theft system for a vehicle as claimed in claim 7, wherein the memory memorizes, in advance, a maximum number of times for permitting unlocking the door after the engine is started by the engine starting switch, and the door locking control device allows for unlocking of the door for the permitted maximum number of times memorized in the memory by the electronic key that is certified by the certifying device of the electronic key for getting in the vehicle and whose ID information is memorized in the memory, after the engine is started by the engine starting control device.

9. The anti-theft system for a vehicle as claimed in claim 7, wherein the memory memorizes, in advance, a maximum number of times for permitting unlocking of the door after the engine is started by the engine starting switch, the maximum number of times being set for every electronic key which is certified and registered, and the door locking control device that allows for unlocking of the door for the permitted maximum number of times memorized in the memory by the electronic key that is certified by the certifying device of the electronic key for getting in the vehicle and whose ID information is memorized in the memory, the maximum number corresponding to the electronic key and being memorized in the memory, after the vehicle is started by the engine starting control device.

10. The anti-theft system for a vehicle as claimed in claim 7, wherein the memory memorizes, in advance, a maximum number of times for permitting unlocking of the door after the engine is started by the engine starting switch, the maximum number being set for every person who is certified and registered, and the door locking control device allows for unlocking of the door for the permitted maximum number of times memorized in the memory by the electronic key that is certified by the certifying device of the electronic key for getting in the vehicle and whose ID information is memorized in the memory, the maximum number corresponding to the person whose human body certification information is confirmed by the human body information certifying device at the time when the engine is started by the engine starting switch, the maximum number being memorized in the memory, after the engine is started by the engine starting switch.

11. The anti-theft system for a vehicle as claimed in claim 8, wherein the door locking control device includes a permission counter that reduces the number of times permission is granted to unlock the door by using the electronic key that is certified by the certifying device of the electronic key for getting in the vehicle and whose ID information is memorized in the memory, when the vehicle door is unlocked and then opened.

12. An anti-theft system for a vehicle, comprising:

a certifying device of an electronic key for starting a vehicle engine, the certifying device certifying the electronic key held by a person who intends to start the vehicle;

a human body certification information certifying device that confirms human body certification information of the person;

an engine starting switch that starts the engine in a case where the electronic key is certified by the certifying device of the electronic key for starting the engine and the human body certification information of the person is confirmed by the human body certification information certifying device in a state where the engine has stopped running;

a writing device for writing information that the human body certification information is confirmed to the electronic key as readable or delete-able information, when the engine is started by the engine starting switch based on the electronic key being certified by the certifying device of the electronic key for starting the engine and the human body certification information of the person being confirmed by the human body certification information certifying device;

a certifying device of an electronic key for starting an engine, the certifying device certifying the electronic key based on a detection by an approaching detection sensor and reception of a response signal sent from the electronic key held by a person who intends to start the engine; and a door locking control device that unlocks the door if the electronic key is certified by the certifying device of the electronic key for starting the engine and the information that the human body certification information is certified is written in the electronic key, without performing human body certification after the engine is started by the engine starting switch, wherein the door locking control device does not unlock the door if the electronic key is certified by the certifying device of the electronic key for starting the engine but the information that the human body certification information is certified is not written in the electronic key, after the engine is started by the engine starting switch.

* * * * *